US010103787B2

(12) United States Patent
Castell

(10) Patent No.: US 10,103,787 B2
(45) Date of Patent: Oct. 16, 2018

(54) EXCHANGING SIGNALS WIRELESSLY BETWEEN DEVICES

(71) Applicant: HEWLETT-PACKARD DEVELOPMENT COMPANY, L.P., Houston, TX (US)

(72) Inventor: Robin T Castell, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/511,741

(22) PCT Filed: Dec. 10, 2014

(86) PCT No.: PCT/US2014/069547
§ 371 (c)(1),
(2) Date: Mar. 16, 2017

(87) PCT Pub. No.: WO2016/093821
PCT Pub. Date: Jun. 16, 2016

(65) Prior Publication Data
US 2017/0288740 A1 Oct. 5, 2017

(51) Int. Cl.
*H04B 5/00* (2006.01)
*H01F 38/14* (2006.01)
(Continued)

(52) U.S. Cl.
CPC ......... *H04B 5/0093* (2013.01); *G06F 1/1656* (2013.01); *G06F 1/1698* (2013.01);
(Continued)

(58) Field of Classification Search
CPC .................................................. H04B 5/0093
(Continued)

(56) References Cited

U.S. PATENT DOCUMENTS 7,511,452 B2   3/2009   Bersenev
8,629,578 B2   1/2014   Kurs et al.
(Continued)

FOREIGN PATENT DOCUMENTS

KR   10-2011-0138881 A   12/2011
WO   WO-03-105311 A1     12/2003

OTHER PUBLICATIONS

Jiang, W. et al.; "Pulse: Low Bitrate Wireless Magnetic Communication for Smartphones"; Sep. 13-17, 2014; 5 pages.
(Continued)

*Primary Examiner* — Ayodeji Ayotunde
(74) *Attorney, Agent, or Firm* — HPI Patent Department

(57) ABSTRACT

Examples disclosed herein provide for the exchange of signals wirelessly between devices. One example includes a first wireless communication unit of a first device and a second wireless communication unit of a second device. The example further includes a first magnetic member disposed within the first device to magnetically couple with a second magnetic member disposed within the second device when the first and second devices are to be placed within proximity of each other. The first and second wireless communication units may exchange signals between the first device and the second device over a wireless communication link formed by the magnetically coupled magnetic members.

17 Claims, 3 Drawing Sheets

(51) Int. Cl.
*G06F 1/16* (2006.01)
*H01Q 19/06* (2006.01)
*H01Q 1/22* (2006.01)
*H02J 50/00* (2016.01)

(52) U.S. Cl.
CPC ........... *H01F 38/14* (2013.01); *H01Q 19/062* (2013.01); *H01Q 1/2258* (2013.01); *H02J 50/00* (2016.02)

(58) Field of Classification Search
USPC ....................................................... 455/41.1
See application file for complete search history.

(56) References Cited

U.S. PATENT DOCUMENTS

| | | |
|---|---|---|
| 2011/0050164 A1 | 3/2011 | Partovi et al. |
| 2011/0133726 A1 | 6/2011 | Ballantyne et al. |
| 2012/0175969 A1 | 7/2012 | Maughan et al. |
| 2013/0229148 A1 | 9/2013 | Khan et al. |
| 2013/0260677 A1* | 10/2013 | Partovi ................... H01F 5/003 455/41.1 |
| 2014/0055945 A1* | 2/2014 | Sudak ................... H04W 4/008 361/679.41 |
| 2014/0059264 A1 | 2/2014 | Sudak |
| 2014/0086586 A1* | 3/2014 | Voutilainen ........... H04M 1/003 398/115 |
| 2014/0347885 A1* | 11/2014 | Wilcox ................... F21S 8/061 362/612 |
| 2015/0065041 A1* | 3/2015 | Ahn ........................ H02J 5/005 455/41.1 |

OTHER PUBLICATIONS

Lu, X. et al; "Wireless Charger Networking for Mobile Devices: Fundamentals, Standards, and Applications"; Oct. 31, 2014; 16 pages.

* cited by examiner

EXCHANGING SIGNALS WIRELESSLY BETWEEN DEVICES

BACKGROUND

Consumers appreciate ease of use and reliability in their devices. They also appreciate aesthetically pleasing designs. Businesses may, therefore, endeavor to create and provide devices directed toward one or more of these objectives.

DETAILED DESCRIPTION

Figure 1A:
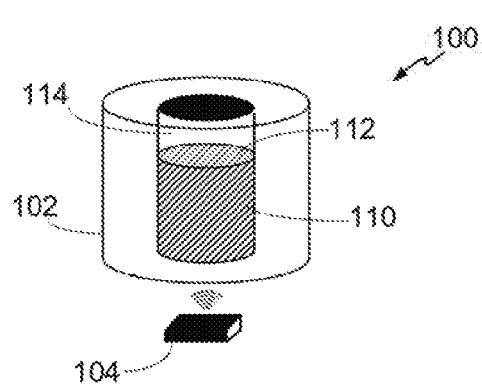
FIGS. 1A-B illustrate example interconnect assemblies that may be incorporated into a device for allowing the device to wirelessly communicate with another device having a corresponding interconnect assembly.

Interconnect assemblies may include various mechanical components or elements, such as prongs, plugs, pins, or clips, which matingly engage a corresponding socket, aperture, opening or receptacle during connection. Examples of such interconnect assemblies include docking connection schemes between devices, and various cable assemblies (e.g., Universal Serial Bus, Video Graphics Array. High Definition Multimedia Interface, IEEE 1394, etc.) for use with devices, such as computers, tablets, mobile phones, televisions, and personal digital assistants. With regards to docking connection schemes, for example, between a notebook computer and a docking station, the notebook computer may need to be properly aligned with the docking station in order to mechanically engage the interconnect assembly between the devices.

The mechanical parts of these interconnect assemblies can be subject to damage and/or fatigue, which can compromise the integrity of a connection. Additionally, dirt, debris, moisture, and other contaminants may collect on or enter such interconnect assemblies and their corresponding sockets, apertures, openings or receptacles which can render them, and/or any devices to which they are connected, inoperable. Furthermore, such interconnect assemblies and their corresponding sockets, apertures, openings and receptacles may detract from the aesthetics of a device for at least some consumers.

Examples disclosed herein provide interconnect assemblies that allow devices to wirelessly communicate with each other. As an example, devices may include a wireless communication unit within their respective housings, which allow the devices to establish a wireless communication link and communicate with each other once they are brought within proximity of each other. The interconnect assemblies may include magnetic members for aligning devices with each other and facilitating the wireless communication link between the devices. Devices utilizing interconnect assemblies that allow wireless communication with other devices may allow manufacturers to design such devices with no apertures or holes for connectors, contributing to the overall aesthetic appeal of the devices.

As used herein, the term "transceive" is defined as including both transmission and reception of data in the form of one or more signals. As used herein, the terms "wireless" and "wirelessly" are defined as including, but are not necessarily limited to, a connection or coupling that does not require mechanical components or elements such as prongs, plugs, pins, or clips that matingly engage a corresponding socket, aperture, opening or receptacle. Wireless connections and couplings may operate in any of a variety of different frequency ranges and wavelengths. They may also be established electrically, magnetically, or optically.

As used herein, the term "device" is defined as including, but is not necessarily limited to, a computer, tablet, mobile phone, television, personal digital assistant, monitor, display, audio component, peripheral, dock, sleeve, docking station, or appliance.

With reference to the figures, FIG. 1A illustrates an interconnect assembly 100 that may be incorporated into a device for allowing the device to wirelessly communicate with another device having a corresponding interconnect assembly, according to an example. The interconnect assembly 100 generally includes a magnetic member 104 and a wireless communication unit 104. Although a cylindrical shape is illustrated, the magnetic member 104 can take any shape. As an example, the magnetic member 104 may include a hollow core to function as a waveguide for propagating signals from the wireless communication unit 104.

As mentioned above, the signals from the wireless communication unit 104 may operate in any of a variety of different frequency ranges and wavelengths. They may also be established electrically, magnetically, or optically. As an example, the wireless communication unit 104 may operate in the extremely high frequency (EHF) range. In other examples, the wireless communication unit 104 may operate substantially at sixty (60) gigahertz (GHz). In still other examples, the wireless communication unit 104 may operate substantially in an infrared frequency range. As will be further described, this use of such wireless technology for the wireless communication unit 104 helps to eliminate the issues, described above, associated with interconnect assemblies that utilize mechanical components.

For facilitating the transmission of signals from the wireless communication unit 104 via the hollow core of the magnetic member 102, the hollow core may include any suitable material for propagation of the signal. As an example, for the propagation of RF signals, the hollow core of the magnetic member 102 may include a plastic core 110 that may be coated with an electrically conductive material to form the waveguide. The plastic core 110 may be flush with the magnetic member 102 (not illustrated) or slightly recessed to provide a small air gap 114, depending on the application. As an example, an end 112 of the plastic core may also be curved to essentially form a lens to help control the shape of the energy beams from the signals as it leaves the connector assembly 100

Figure 1B:
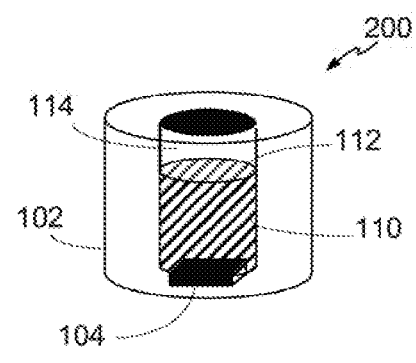

Referring to FIGS. 1A-B, the wireless communication unit 104 may be a separate component from the magnetic member 102 (e.g., see FIG. 1A) or embedded into the magnetic member 102 to form a single assembly (e.g., see FIG. 18). As illustrated in FIG. 18, the wireless communication unit 104 may be embedded in the plastic core 110. Although the remaining figures illustrate wireless communication units as a separate component from magnetic members, wireless communication units may also be embedded within magnetic members.

As an example, the wireless communication unit 104 may be designed for short range proximity connectivity applications, as will be further described. When the wireless communication unit 104 is a separate component from the magnetic member 102, the wireless communication unit 104 may be coupled to the waveguide (e.g., plastic core 110) of the magnetic member 102 by a suitable waveguide (e.g., a plastic waveguide), in order to avoid any loss in transmissions from the wireless communication unit 104.

Figure 2A:
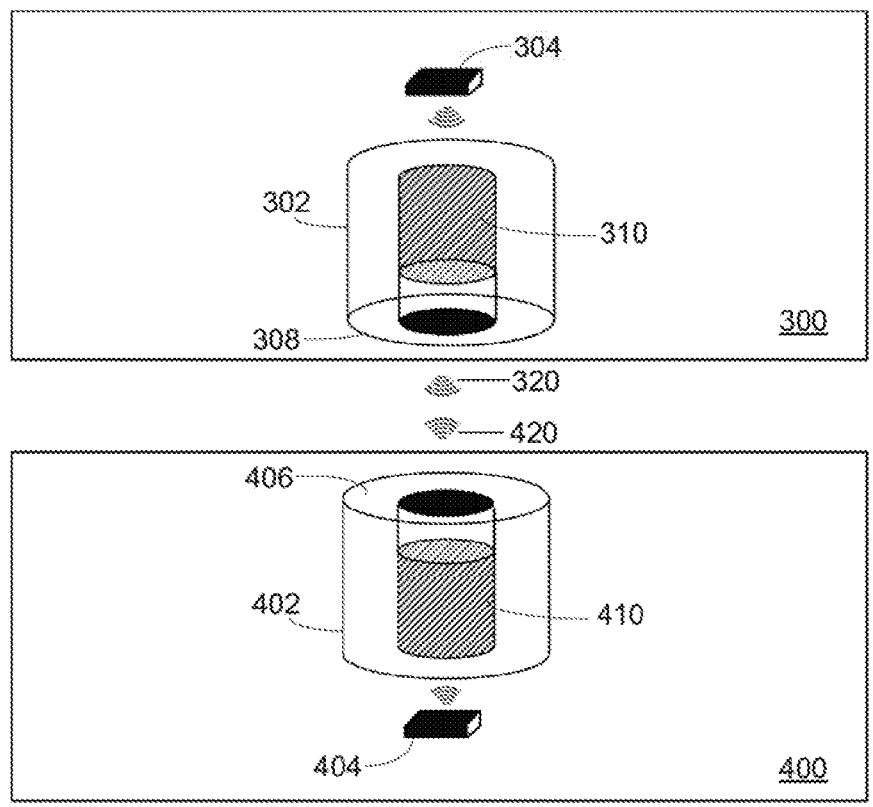
FIGS. 2A-B illustrate the examples for forming a wireless communication link between two devices.
Figure 2B:
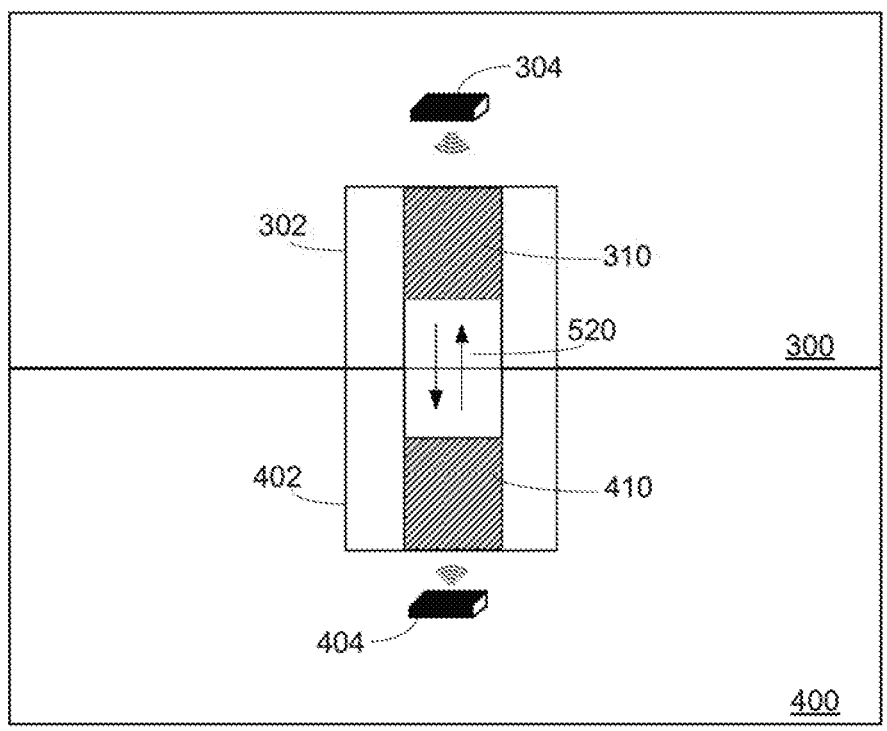

FIGS. 2A-B illustrate the process for forming a wireless communication link between two devices, according to an example. As will be further described, once the wireless communication link is established between the first and second device 300, 400, data connectivity may be achieved between the devices 300, 400. In addition, power connectivity may be achieved between the devices 300, 400, as will be further described. As an example, a situation where it may be desirable to have power and/or data connectivity between devices includes a tablet computer or notebook computer docking to a docking station. Other examples include various cable assemblies (e.g., Universal Serial Bus, Video Graphics Array, High Definition Multimedia Interface, IEEE 1394, etc.) for use with devices, such as computers, tablets, mobile phones, televisions, and personal digital assistants.

Referring to FIG. 2A, a first device 300 may be placed within proximity of a second device 400 in order to form the wireless communication link. For example, it may not be desirable to establish the wireless communication link when the devices 300, 400 are not in proximity to each other (e.g., more than several centimeters from each other), particularly to avoid signal loss or signal interference with other wireless communication units within the devices 300, 400 or surrounding devices. As illustrated, the first device 300 may include an interconnect assembly to wirelessly communicate with another interconnect assembly disposed within the second device 400. The interconnect assembly disposed within the first device 300 may include magnetic member 302 and wireless communication unit 304. Similarly, the interconnect assembly disposed within the second device 400 may include magnetic member 402 and wireless communication unit 404.

The features included in the interconnect assemblies of the first and second devices 300, 400 may correspond to the interconnect assemblies 100, 200 described above. For example, the magnetic members 302, 402 may include suitable material for propagation of signals from wireless communication units 304, 404, respectively. As an example, the hollow core of the magnetic members 302, 402 may include plastic cores 310, 410, respectively, that may be coated with electrically conductive material to form waveguides.

As illustrated, transmissions of signals from wireless communication unit 304 may propagate via plastic core 310 and pass through an enclosure wall of the device 300 (indicated by transmission 320). Similarly, transmissions of signals from wireless communication unit 404 may propagate via plastic core 410 and pass through an enclosure wall of the device 400 (indicated by transmission 420). In order for transmissions from wireless communication units 304, 404 to exit the enclosure walls, the materials and wall thickness may be chosen appropriately. In addition, it may not be necessary to mount the magnetic members 302, 402 flush against the enclosure walls in order to achieve wireless connectivity.

Referring to FIG. 2B, as the devices 300, 400 are placed within proximity of each other, magnetic members 302, 402 may cause devices 300, 400 to self-align with each other, and the magnetic members 302, 402 may then facilitate the wireless communication link between the devices 300, 400, for example, by aligning plastic cores 310, 410. The magnetic members 302, 402 may be arranged to produce magnetic fields that cooperate with each other to generate a magnetically attractive retention force that attaches the first device 300 and the second device 400 together in a mating engagement. Properties of the magnetic members 302, 402 that may be controlled include, but are not limited to, field strength and magnetic polarity. For example, an end 308 of magnet 302 may have a polarity (e.g., south pole) to magnetically attract an end 406 of magnet 402 (e.g., north pole). This magnetic coupling may allow for the devices 300, 400 to remain magnetically coupled to each other until a sufficient force is applied to overcome the magnetic coupling.

Although a single magnetic member 302 in first device 300 and a single magnetic member 402 in second device 400 are shown in the example of FIGS. 2A-B, it is to be understood that a different number and/or arrangement of magnets may be used in other examples. For example, any number of magnets may be used in devices 300, 400 to provide a self-alignment as the devices 300, 400 are placed within proximity of each other, and the magnets may provide a retention force once the contact is made. As an example, although magnetic members 302, 402 may be included as waveguides to propagate signals from wireless communication units 304, 404 (e.g., to provide the wireless connection), additional magnets may be provided to provide the necessary alignment and retention forces.

Once the devices 300, 400 are magnetically coupled to each other, as illustrated in FIG. 2B, wireless communication units 304, 404 may transceive data with each other (indicated by arrows 520), for example, via the wireless communication link formed by the magnetically coupled members 302, 402. As an example, the hollow cores of the magnetic members 302, 402 (or any suitable material for propagation, such as plastic cores 310, 410) may facilitate the exchange of data between the wireless communication units 304, 404. The wireless communication link provided by aligning the waveguides disposed within magnetic members 302, 402 may provide a self-shielding container to minimize any energy leakage. As a result, this may reduce any crosstalk interference and allow for a greater density of similar wireless communication links to be formed between devices 300, 400.

As an example, as the magnetic members 302, 402 provide a magnetically attractive retention force for aligning and magnetically attaching the devices 300, 400 to each other, in addition to achieving data connectivity, power connectivity may also be achieved, as will be further described. Referring to FIG. 2B, although magnetic members 302, 402 are disposed within devices 300, 400, end 308 of magnetic member 302 and end 406 of magnetic member 402 may be exposed through the enclosure walls (or slightly proud of the enclosure walls) of both devices 300, 400 (not illustrated). As an example, an outside surface of the magnetic members 302, 402, including ends 308, 406, may be coated with an electrically conductive material, in order to serve as a power connector. As a result, when magnetic member 302 is to magnetically couple with magnetic member 402, the electrically conductive material of both magnetic members 302, 402 may make contact with each other, achieving power connectivity. As an example, the power connectivity may allow for the first device 300 (e.g., a docking station) to transfer power from a connected power source (e.g., AC power) to the second device 400 (e.g., a tablet computer).

Figure 3:
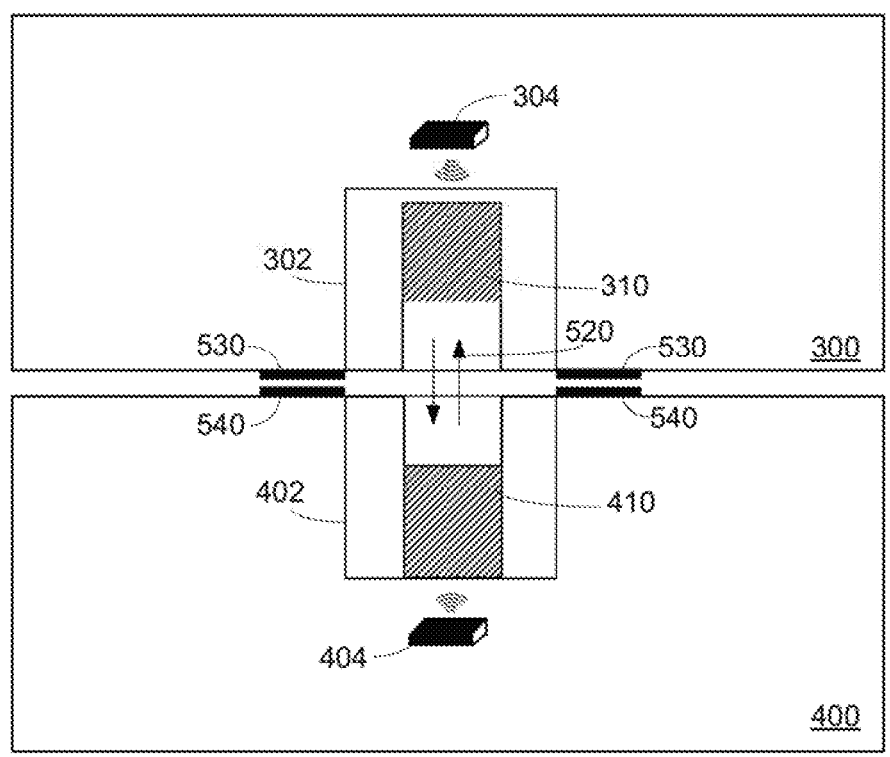
FIG. 3 illustrates the use of electrical contacts for achieving power connectivity between devices, according to an example.

Referring to FIG. 3, rather than using the magnetic members 302, 402 to achiever power connectivity, separate electrical contacts 530, 540 may be used instead for achieving power connectivity, according to an example. As illustrated, the magnetic member 302, 402 may be positioned or disposed within the devices 300, 400. As mentioned above, in order for transmissions from wireless communication units 304, 404 to exit the enclosure walls, the materials and wall thickness may be chosen appropriately. In addition, it may not be necessary to mount the magnetic members 302, 402 flush against the enclosure walls in order to achieve wireless connectivity. As an example, the electrical contacts 530, 540 may be located on or placed through the enclosure walls of devices 300, 400. Although device 300 illustrates a pair of electrical contacts 530 matching with a pair of electrical contacts 540 associated with device 400, the number of electrical contacts and arrangement may vary.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
    a first wireless communication unit of a first device;
    a second wireless communication unit of a second device; and
    a first hollow magnetic member disposed within the first device to magnetically couple with a second hollow magnetic member disposed within the second device when the first and second devices are to be placed within proximity of each other, wherein:
        the first hollow magnetic member comprises a first waveguide disposed in a hollow core of the first hollow magnetic member;
        the second hollow magnetic member comprises a second waveguide disposed in a hollow core of the second hollow magnetic member; and
        the first and second wireless communication units are to exchange signals between the first device and the second device over a wireless communication link formed by the magnetically coupled magnetic members.

2. The system of claim 1, wherein each waveguide is recessed within the first and second hollow magnetic members.

3. The system of claim 1, wherein an end of each waveguide is curved to form a lens to control the transmission of the signals.

4. The system of claim 1, wherein the first and second wireless communication units are embedded within the first and second hollow magnetic members, respectively.

5. The system of claim 1, wherein the first and second wireless communication units are to communicate data over the wireless communication link only when the first and second devices are to be placed within proximity of each other.

6. The system of claim 1, wherein an outside surface of the first and second hollow magnetic members are coated with an electrically conductive material.

7. The system of claim 6, wherein when the first hollow magnetic member is to magnetically couple with the second hollow magnetic member, the electrically conductive coating of the first hollow magnetic member is to make contact with the electrically conductive coating of the second hollow magnetic member to power the second device.

8. A system comprising:
    a first wireless communication unit of a first device;
    a second wireless communication unit of a second device;
    a first hollow magnetic member disposed within the first device to magnetically couple with a second hollow magnetic member disposed within the second device when the first and second devices are to be placed within proximity of each other, wherein:
        the first hollow magnetic member comprises a first waveguide disposed in a hollow core of the first hollow magnetic member;
        the second hollow magnetic member comprises a second waveguide disposed in a hollow core of the second hollow magnetic member; and
        the first and second wireless communication units are to exchange signals between the first device and the second device over a wireless communication link formed by the magnetically coupled hollow magnetic members; and
    electrically conductive material to coat an outside surface of the first and second hollow magnetic members, wherein when the first hollow magnetic member is to magnetically couple with the second hollow magnetic member, the electrically conductive coating of the first hollow magnetic member is to make contact with the electrically conductive coating of the second hollow magnetic member to power the second device.

9. The system of claim 8, wherein each waveguide is recessed within the first and second hollow magnetic members.

10. The system of claim 8, wherein the first and second wireless communication units are embedded within the first and second hollow magnetic members, respectively.

11. The system of claim 1, wherein each waveguide is flush with the first and second hollow magnetic members.

12. The system of claim 1, wherein the first device comprises a number of additional magnets to align and retain the second device.

13. The system of claim 1, wherein the second device comprises a number of additional magnets to align and retain the first device.

14. The system of claim 1, wherein ends of the first hollow magnetic member and second hollow magnetic member extend through enclosures of respective devices.

15. The system of claim 1, further comprising:
    first electrical contacts of the first device; and
    second electrical contacts of the second device.

16. The system of claim 15, wherein:
the first electrical contacts are disposed within enclosure walls of the first device; and
the second electrical contacts are disposed within enclosure walls of the second device.

17. The system of claim 15, wherein the electrical contacts are separate from the hollow magnetic members.

* * * * *